United States Patent

Pyo et al.

[11] Patent Number: 5,854,609
[45] Date of Patent: Dec. 29, 1998

[54] SATELLITE TRACKING METHOD FOR VEHICLE-MOUNTED ANTENNA SYSTEM

[75] Inventors: Cheol-Sig Pyo; Sook-Ik Jeon; Chan-Goo Park, all of Daejeon, Rep. of Korea

[73] Assignee: Electronics and Telecommunications Research Institute, Daejeon, Rep. of Korea

[21] Appl. No.: 932,369

[22] Filed: Sep. 17, 1997

[30]    Foreign Application Priority Data

Dec. 2, 1996 [KR] Rep. of Korea .................. 1996-61025

[51] Int. Cl.$^6$ ...................................................... H01Q 3/00
[52] U.S. Cl. .............................. 342/359; 342/75; 342/77; 342/427
[58] Field of Search .................................. 342/74, 75, 76, 342/77, 359, 427

[56]    References Cited

U.S. PATENT DOCUMENTS

| | | | |
|---|---|---|---|
| 4,994,812 | 2/1991 | Uematsu et al. | 342/359 |
| 5,073,783 | 12/1991 | Uematsu et al. | 342/359 |
| 5,166,693 | 11/1992 | Nishikawa et al. | 342/422 |
| 5,241,319 | 8/1993 | Shimizu | 342/358 |

*Primary Examiner*—Thomas H. Tarcza
*Assistant Examiner*—Dao L. Phan
*Attorney, Agent, or Firm*—Cohen, Pontani, Lieberman & Pavane

[57]    ABSTRACT

A satellite tracking method for a vehicle-mounted receiving antenna system to determine the orientations of satellites dependent upon the moving direction of a moving body such as an automobile associated with the attitude control of an antenna which is mounted on the moving body for the purpose of receiving satellite broadcasting signal, the method including an initial mode, a maximum value search mode, a normal tracking mode, an error correction mode, a signal blocking mode and a rainfall mode.

15 Claims, 8 Drawing Sheets

SATELLITE TRACKING METHOD FOR VEHICLE-MOUNTED ANTENNA SYSTEM

BACKGROUND OF THE INVENTION

1. Field of the Invention

The present invention relates to a satellite tracking method for a vehicle-mounted receiving antenna system and, more particularly, to a method of determining the positions of satellites dependent upon the moving direction of a moving body such as an automobile associated with the attitude control of an antenna which is mounted on the moving body for the purpose of receiving satellite broadcasting signal.

2. Discussion of Related Art

To receive signals transmitted from a satellite at a receiving antenna mounted on a moving body such as an automobile, it is necessarily required to provide a proper method of tracking the satellite so as to maintain the attitude of the antenna which coincides with the direction of the satellite. In general, there are known an open-loop control system which utilizes sensors, a closed-loop control system utilizing the signals received from the satellites, and a hybrid system which adopts the above two systems.

The closed-loop control system includes a step track method and a monopulse method. The open-loop control system, which utilizes only sensors such as a geomagnetic compass and a rate sensor, is popular as a satellite tracking system for ships and aircrafts equipped with navigation systems such as an NNSS (Navy Navigation Satellite System) and INS (Inertial Navigation System).

In case of land mobiles, however, the radio wave signals from the satellite may be blocked by any obstruction such as building or the like. For this reason, it is known that the hybrid system is satisfactory on tracking the satellite because it employs both the step track or monopulse methods and an angle sensor.

The existing satellite tracking method includes an initial satellite search mode, a track mode and a blocking process mode. The initial satellite search mode is adapted to maintain the beam direction to the satellite by slightly varying the direction of the antenna at a suitable time interval so that the beam of antenna is pointed in the direction of the received signal whose strength becomes maximum. In the track mode, the beam is aimed directly at the satellite by signal levels, phase signals of a monopulse or the rotation angle of the vehicle when the signal level is larger than a designated value. The blocking process mode is adapted to control the beam of the antenna to the satellite depending on the data transmitted from a sensor for detecting the turning angle of the moving body which is under the blocking situation by any obstruction such as building, tunnel or the like.

Besides, a conventional vehicle-mounted receiving antenna is used for tracking a Ku-band broadcasting satellite according to a pointing error angle obtained by the monopulse method, an azimuth angle transmitted from the gyroscope, and an AGC (Automatic Gain Control) voltage from receiver. To accomplish the satellite search mode at the very beginning, the levels of the received signals expressed in AGC voltages are monitored and concurrently the azimuthal angle is incremented by 1 degree until the reception level exceeds the threshold level $L_0$. When the reception level is larger than the threshold level $L_0$, it will proceed to the tracking process.

In the tracking process, the pointing error angle is calculated by using the phase difference of the monopulse and the gyro data. The process of the gyro data is accomplished when the reception level is smaller than or equal to the threshold voltage level $L_0$. Then the gyro data is compared with those produced before the reception level becomes below the threshold voltage level, so that the pointing error angle of the antenna is calculated for the purpose of maintaining the prior attitude of the antenna. The tracking process maintains until the time value of a timer exceeds a predetermined time $T_0$. If the reception level is below the threshold voltage level $L_0$ after the predetermined time $T_0$, the process will be returned to the search process mode.

An example of the prior art is disclosed in U.S. Pat. No. 4,994,812 under the title of "Antenna System" disclosing a vehicle-mounted receptive antenna for the Ku-band satellite broadcasting, which was contrived in order to remove errors included in phase error signals obtained from the monopulse and thereby precisely detect the pointing error angle. The errors can be removed by calculating the ratio of phase error signals expressed by sine-cosine functions.

To accurately track satellites, we must determine a mean square of the sine & phase error signal of monopulse, thereby calculating absolute error signal and gyro data. If the mean square of the sine & phase error signal is smaller than or equal to a given threshold level voltage in the initial satellite search process, the antenna will be rotated in every direction for a predetermined time. If the error signal is greater than a given threshold level voltage, the scanning is stopped and a peak detection will be performed.

In the peak detection, after the antenna is rotated, a mean square of the sine & phase error signal values is compared with that obtained before the rotation of the antenna. If the former is larger than the latter, the antenna will be rotated in the current direction. But, if not so, the antenna will be rotated in the reverse direction so as to match its directivity with the direction of the satellite.

After the process, the gyro data are reset and angle data are read from absolute error signals so as to control the antenna. The mean square of the sine & phase error signal values is then compared with a predetermined threshold voltage. If the former is larger than the latter, it is judged that the directivity of the antenna highly coincides with the orientation of the satellite. Accordingly, the gyro data are reset and the pointing error angle is calculated by the gyro data. In the blocking process, the pointing error angle from the gyro data is read for the purpose of controlling the antenna if the mean square is smaller than the predetermined threshold voltage which means the blocking of signal. When the former becomes larger than the latter, the antenna will be controlled depending on error signals.

Another example of the prior art is disclosed in U.S. Pat. No. 5,166,693 under the title of "Mobile Antenna System" which was contrived for the purpose of L-band satellite mobile communication. The satellite tracking controlling method comprises a satellite direction search section, an on-turning beam control section, an on-nonturning beam control section and an on-blocking beam control section.

If the reception signal level is smaller than a switching signal level, it is compared with a blocking signal level. If the reception signal level is smaller than the blocking signal level, the satellite is tracked depending on the data of an angle sensor in the on-blocking control section. If the former is larger than or equal to the latter, the data of the angle sensor is compared with a prior one so as to determine the turning state.

The satellite direction search section is adapted to search a direction of satellite by changing the beam direction of the antenna and finding the direction of the satellite in which the reception signal level becomes maximum.

The on-blocking beam control section is adapted to determine a turning angle by reading the data of an angle sensor. When the turning angle is larger than a reference angle, the beam is moved and the reception signal level is compared with the switching signal level. If the reception signal level is larger than or equal to the switching signal level, the process remains. If not so, the prior process is repeated until a predetermined time in the timer. After the predetermined time, the process goes to the satellite search section.

In the on-nonturning beam control section, the reception signal level is compared with the blocking signal level and the switching signal level. If the reception signal level is larger than the blocking signal level and smaller than the switching signal level, the beam is moved to the left direction. Then, the beam is moved to the left when the reception signal level at the motion of the beam is smaller than a prior one. If not so, the beam is moved to the right. With the reception signal level at the right-motion of the beam larger than a prior one, the reception signal level is compared with the switching signal level. If not so, the beam is returned to the original direction.

The on-turning beam control section controls the beam of the antenna when the moving vehicle turns. More particularly, the beam of the antenna is moved to be directed to the satellite. If the reception signal level received during the rotation of the antenna is larger than that after the rotation, it is compared with the switching signal level. If not so, the beam is moved in the original direction.

When the conventional satellite tracking method of the vehicle-mounted antenna as described above is adapted to a mobile-mounted satellite broadcasting receiving system, it has the following disadvantages of problems:

(1) the receiving antenna cannot initially search for the orientation of the satellite when the moving body moves with a large pointing error with respect to the satellite, even though the beam direction of an antenna may be accurately controlled depending on the orientation of a moving body which is at a standstill, or by an accidental coincidence with the direction of the satellite;

(2) the initial direction of the satellite cannot be search for when the attenuation in reception signal levels caused by a rainfall varies with the elapsed time in the initial satellite search mode;

(3) it cannot search for the direction of the satellite in case of a sudden signal blocking during the initial satellite search mode; and (4) it is cannot track the satellite in case of the sudden reduction of the reception signal level due to a rainfall attenuation.

SUMMARY OF THE INVENTION

Accordingly, the present invention is directed to a satellite tracking method for a vehicle-mounted antenna system that substantially obviates one or more of the problems due to limitations and disadvantages of the related art.

An object of the present invention is to provide a satellite tracking method for a vehicle-mounted antenna system in order to accurately track the satellites depending on the orientation of the moving vehicle successfully even in case of a rainfall and a signal interruption.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a satellite tracking method for a vehicle-mounted antenna system, in which a satellite tracking controller receives a signal through a satellite broadcasting receiver and a turning angle of a moving body provided by a gyroscope for the purpose of controlling an antenna orientation control driver and rotating the antenna mounted on the mobile, comprises: an initial mode for rotating the antenna depending on the turning angle of the moving body until a reception signal level voltage d transmitted from a satellite with a system power on is larger than a fourth threshold voltage R corresponding to a predetermined rainfall margin; a maximum value search mode for rotating the antenna depending on the turning angle of the moving body and the symmetric point of the reception signal level voltage with respect to the maximum reception signal level voltage so as to search for a first threshold voltage $P_p$ that is a voltage corresponding to the maximum reception signal level voltage, the maximum value search mode accomplished when the reception signal level voltage is larger than the fourth threshold voltage; a normal tracking mode for controlling the orientation of the antenna depending on the turning angle of the moving body so as to maintain the reception signal level voltage to be larger than a second threshold voltage M, the normal tracking mode accomplished when the reception signal level voltage is between the first threshold voltage and the second threshold voltage; an error correction mode for rotating the antenna in the left and right directions depending on the turning angle of the moving body and proceeding other modes according to the results of the judgement whether or not the reception signal level voltage is between the second threshold voltage and a third threshold voltage m, the error correction mode accomplished when the reception signal level voltage is not between the first threshold voltage and the second threshold voltage; a signal blocking mode for controlling the orientation of the antenna depending on the turning angle of the moving body until a time value in a timer is over a predetermined time, the signal blocking mode accomplished when the reception signal level voltage is smaller than the third threshold voltage, or smaller than or equal to the second threshold voltage; and a rainfall mode for controlling the orientation of the antenna depending on the turning angle of the moving body in the same manner as the normal tracking mode, the rainfall mode accomplished when the time value in the timer exceeds the predetermined time and the reception signal level voltage is between the fourth threshold voltage and the third threshold voltage even though the reception signal level voltage is in the same range as in the signal blocking mode, wherein the first threshold voltage > the second threshold voltage > the third threshold voltage > the fourth threshold voltage, the second threshold voltage is a voltage when the reception signal level voltage is smaller than the first threshold voltage by a predetermined voltage level, the third threshold voltage is a voltage when the reception signal level voltage is smaller than the second threshold voltage by a predetermined voltage level.

The initial mode comprises the steps of reading the turning angle c of the moving mobile, calculating an absolute turning angle b of the moving body by using the turning angle of the moving body so as to sequentially detect the reception signal level voltages, rotating the antenna by the calculated absolute turning angle of the moving body and concurrently measuring the reception signal level voltage, repeatedly judging whether or not the reception signal level voltage is larger than the fourth threshold voltage, and when the reception signal level voltage is larger than the fourth threshold voltage, resetting a counter CK and a resistor P indicating a turning direction, and setting the fourth threshold voltage in a resistor D.

The reception signal level voltage is obtained by measuring a signal corresponding to one channel while a turning angle of the antenna is incremented by 1 degree. Further, the absolute turning angle of the moving body is calculated by subtracting the turning angle of the moving body from an absolute azimuthal angle.

The maximum search mode comprises the steps of reading a first turning angle of the mobile, calculating a first absolute turning angle of the moving body by using the first turning angle of the mobile, rotating the antenna depending on the first absolute turning angle of the moving body and concurrently measuring a first reception signal level voltage, increasing the count number of the measurement for the first reception signal level voltage until the first reception signal level voltage is smaller than the fourth threshold voltage, reading a second turning angle of the moving body when the first reception signal level voltage is smaller than the fourth threshold voltage, calculating a second absolute turning angle of the moving body by using the second turning angle of the moving body so as to obtain an angle with respect to the maximum value of the reception signal level voltage, reversely rotating the antenna by the calculated second absolute turning angle of the mobile, and reading a second reception signal level voltage when the antenna is reversely rotated.

The first absolute turning angle of the moving body is calculated from an equation given by $b=(-1)^P 0.1-c$, where P is a state value corresponding to the turning direction of the antenna and c is the first turning angle of the mobile. The first reception signal level voltage is measured by rotating a step motor by 0.1 degree. In addition, the second absolute turning angle of the moving body is calculated from an equation given by $b=-0.1 \, \text{int}[CK/2]-c$.

The initial mode is performed again after resetting the power when the reception signal level voltage is below the fourth threshold voltage due to a sudden signal interruption after the completion of the maximum value search mode.

The error correction mode comprises the steps of setting the count value CK and the maximum reception signal level voltage P at zero, calculating the absolute turning angle of the moving body by using the turning angle of the mobile, rotating the antenna in the left and right directions by the calculated absolute turning angle of the moving body and concurrently measuring the reception signal level voltage, incrementing the moving direction of the motor by one so as to search for the count value and the maximum reception signal level voltage, and repeatedly judging whether the measured reception signal level voltage is larger than or equal to the third threshold voltage, and smaller than or equal to the second threshold voltage.

The maximum value search mode is performed when the reception signal level voltage is larger than the second threshold level voltage. The absolute turning angle of the moving body is calculated from an equation given by $b=((-1)^P \times 0.1 \, CK-c$, where $(-1)^P$ is a state value corresponding to the final turning direction of the antenna, CK is the counted value and c is the first turning angle of the mobile.

The signal blocking mode comprises the steps of storing all state parameters and setting the timer at zero, reading and storing the turning angle of the mobile, reversely rotating the antenna by the turning angle of the moving body and concurrently detecting the reception signal level voltage, and if the detected reception signal level voltage is larger than or equal to the third threshold voltage, proceeding to the error correction mode, otherwise reversely rotating the antenna depending on the turning angle of the moving body during the operation of the timer.

If the reception signal level voltage is smaller than the third threshold voltage after the completion of the operation of the timer, further comprising the step of judging whether the reception signal level voltage is larger than or equal to the third threshold voltage.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF PREFERRED EMBODIMENT

Reference will now be made in detail to the preferred embodiments of the present invention, examples of which are illustrated in the accompanying drawings.

Figure 1:
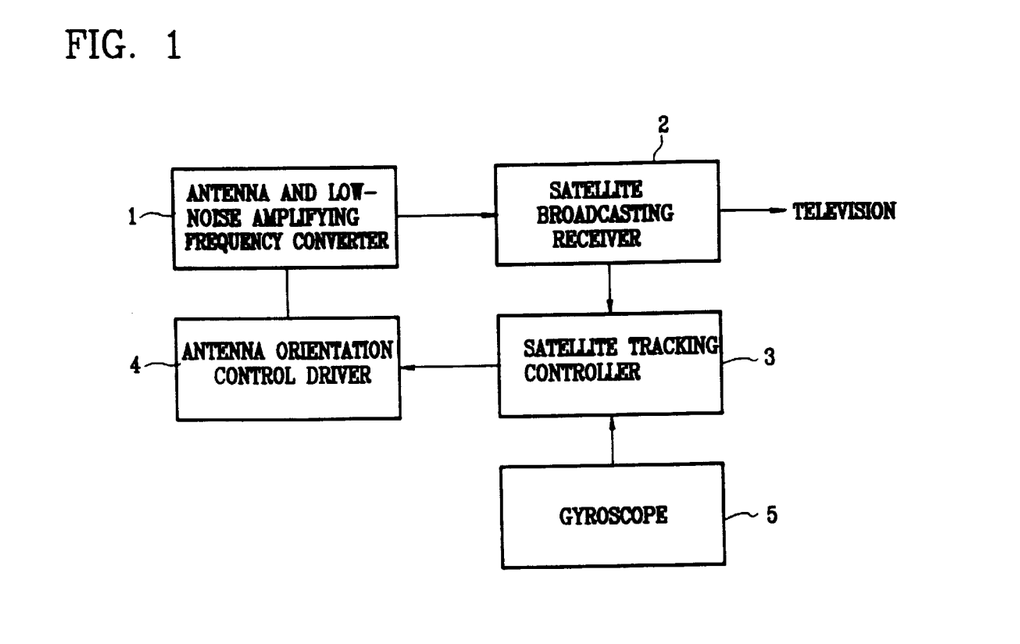
FIG. 1 is a schematic block diagram of a vehicle-mounted receiving antenna of satellite broadcasting as constructed according to the preferred embodiment of the present invention.

FIG. 1 is a schematic block diagram of a vehicle-mounted receiving antenna of satellite broadcasting as constructed according to the preferred embodiment of the present invention.

The satellite broadcasting receiving antenna largely comprises an antenna, a low-noise amplifying frequency converter 1, a satellite broadcasting receiver 2, a satellite tracking controller 3, an antenna orientation control driver 4 and a gyroscope 5.

The antenna is in the form of a flat board so as to be readily mounted on a vehicle. It is mounted on the rotation axis of a motor for the purpose of controlling its beam direction. The antenna receives satellite broadcasting signals in the range of 11.7 GHz to 12.0 GHz from satellites. The low-noise amplifying frequency converter which is directly mounted on the antenna amplifies the satellite broadcasting signals in the frequency band between 11.7 GHz and 12.0 GHz. Then, the converter changes the frequencies of the satellite signals in the range of 11.7 GHz to 12.0 GHz into mid-frequencies in the range of 950 MHz to 1250 MHz and sends them to the satellite broadcasting receiver 2.

The satellite broadcasting receiver 2 selects signals of one channel in a desired frequency band of 27 MHz out of the satellite broadcasting signals in the range of 950 MHz to 1250 MHz for the purpose of using them for a satellite tracking control. After the selected satellite broadcasting signals are demodulated, they are transmitted to a television unit. Then, the satellite broadcasting receiver 2 detects the selected reception signal levels in the frequency band of 27 MHz with DC voltage and sends them to the satellite tracking controller 3.

The satellite tracking controller 3 which is a device for tracking satellites according to the present invention provides a control signal to the antenna orientation control driver 4. To transmit the control signal to the antenna orientation control driver 4, the satellite tracking controller 3 operates the algorithm suggested by the present invention with the voltages corresponding to the reception signal levels generated from the satellite broadcasting receiver 2 and the turning angle of a moving vehicle such as a moving body provided by the gyroscope 5.

The antenna orientation control driver 4 receives the control signal from the satellite tracking controller 3 and drives a step motor in order to rotate the antenna by 0.1 degree or less.

The gyroscope 5, which is a rotation angle sensor for detecting the turning angle of the mobile, converts the detected turning angle of the moving body into digital signals in every 0.01 seconds. It provides the converted digital signals to the satellite tracking controller 3.

Figure 2:
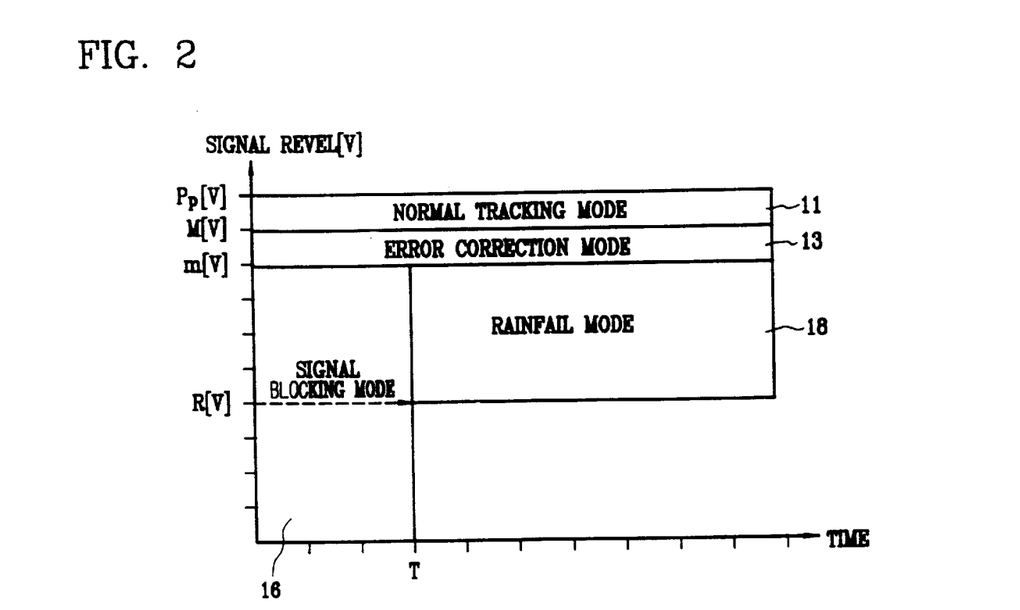
FIG. 2 is a graph showing the modes of a method of tracking satellites of the vehicle-mounted antenna system according to the present invention.

FIG. 2 is a graph to classify the modes of a method of tracking satellites of the vehicle-mounted antenna system according to the present invention.

As shown in FIG. 2, the time of minute unit is plotted on the axis of x representing predetermined times in a timer and the reception signal levels are plotted on the axis of y.

A normal track mode 11 is performed while the reception signal level voltage d is between first and second threshold voltages $P_P$ and M, that is, $M < d < P_P$. The first threshold voltage $P_P$ is a voltage when the directivity in the azimuth direction of an antenna coincides with the direction of an incoming radio wave from the satellite and thereby the reception signal level becomes maximum. The second threshold voltage M is when the reception signal level voltage is decreased the first threshold voltage by A1 dB.

An error correction mode 13 is accomplished while the reception signal level voltage d is between the second threshold voltage M and a third threshold voltages m, that is, $M \leqq d \leqq M$. The third threshold voltage m is a voltage when the reception signal level voltage d is smaller than the second threshold voltage M by A2 dB.

In a signal blocking mode 16, the reception signal level voltage d is smaller than the third threshold voltage m and the time value in the timer is not over a predetermined time T (can be fixed to several minutes or so according to circumstantial conditions such as buildings and tunnels). Therefore, d < m, and the time value of the timer $\leqq$ T.

In a rainfall mode 18, a rain attenuation takes place for the reception signal level voltage by a level voltage corresponding to a rainfall margin which is predetermined in the satellite broadcasting receiving antenna system. The rainfall mode 18 is accomplished when the reception signal level voltage d is between a fourth threshold voltage R and a third threshold voltage m, where the fourth threshold voltage R is the reception signal level voltage under the rain attenuation by the predetermined rainfall margin. Further, the time value of the timer is over a predetermined time T. Thus, $R \leqq d <$ m, and the time value of the timer > T.

Figure 3:
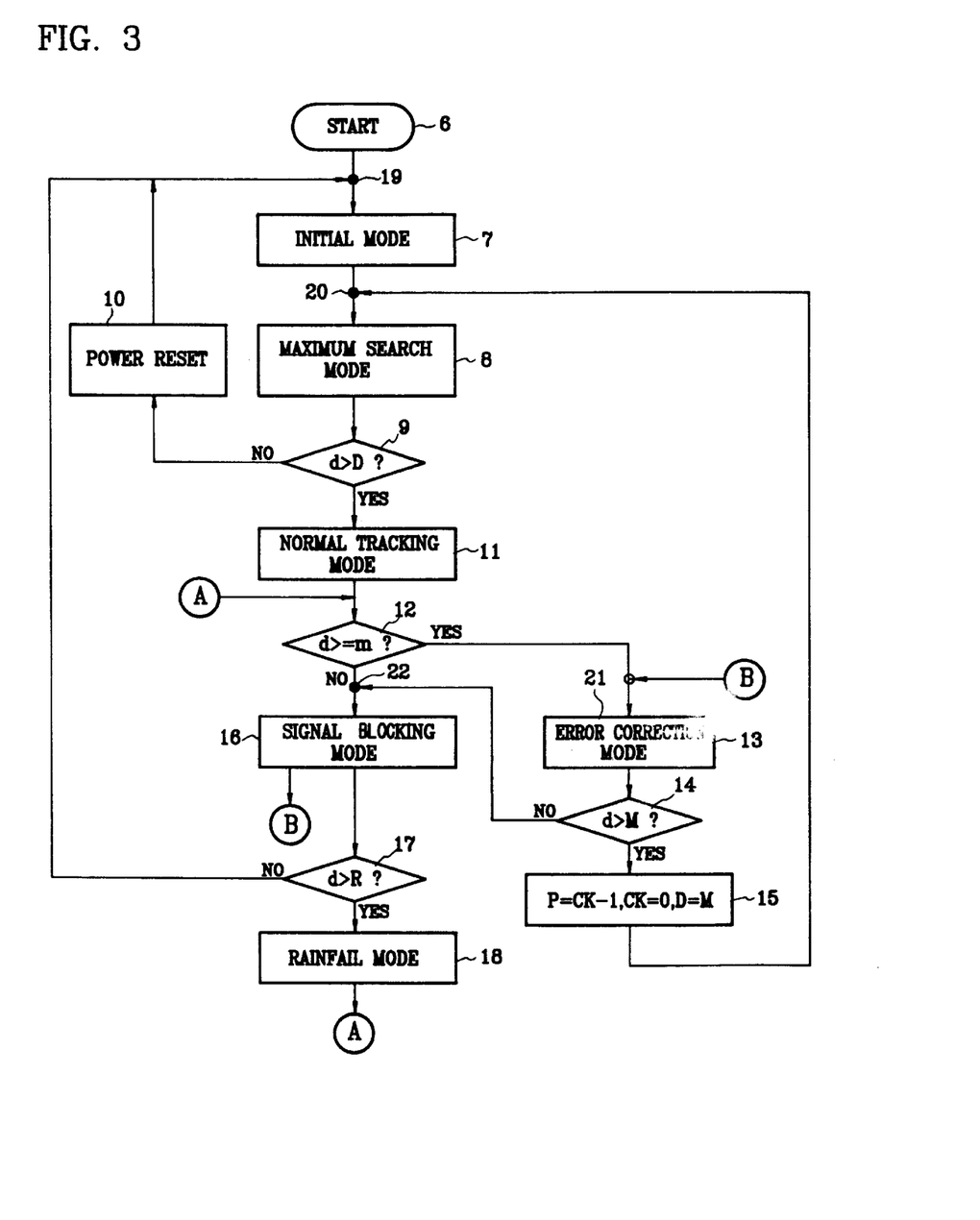
FIG. 3 is a flow chart illustrating the method of tracking satellites of the vehicle-mounted antenna system according to the present invention.

FIG. 3 is a flow chart illustrating the method of tracking satellites of the vehicle-mounted antenna system according to the present invention.

The method of tracking satellites of the vehicle-mounted antenna system comprises an initial mode 7, a maximum value search mode 8, the normal tracking mode 11, the error correction mode 13, the signal blocking mode 16 and a rainfall mode 18.

Each mode is illustrated in detail with reference to FIGS. 4 through 9.

The turning angle of the moving body referred to in the present invention is based on the angle data detected by the gyroscope.

Figure 4:
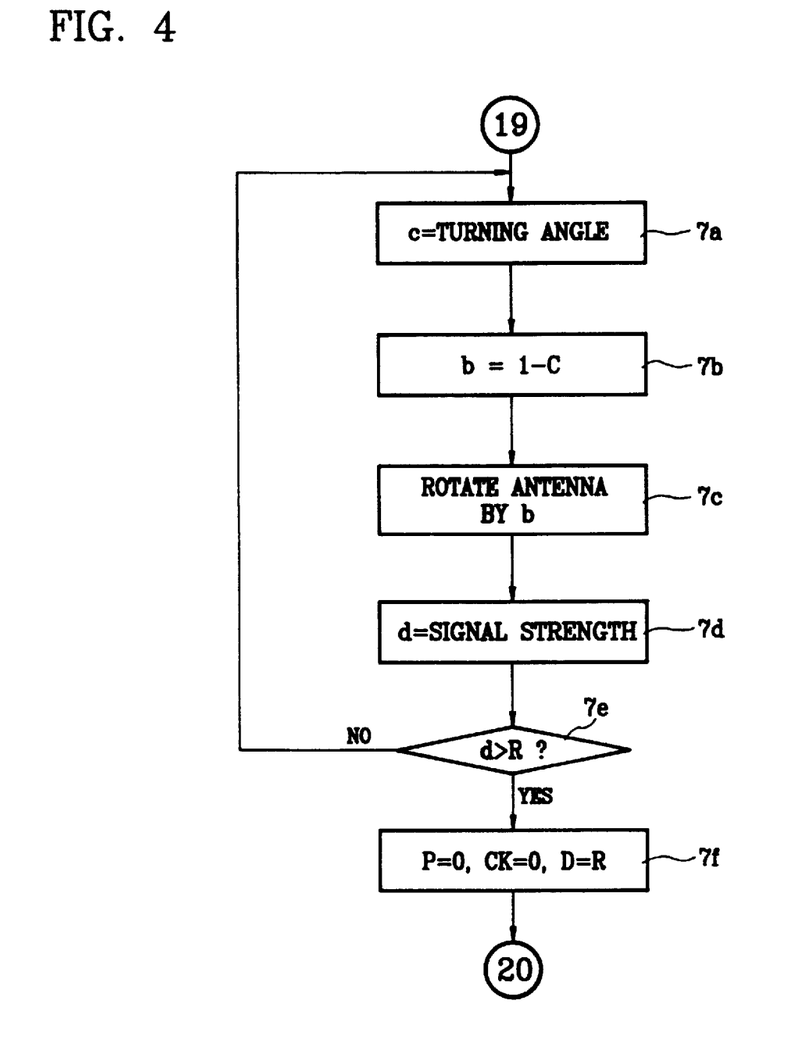
FIG. 4 is a flow chart illustrating the initial mode of the method of tracking satellites of the vehicle-mounted antenna system according to the present invention.

FIG. 4 is a flow chart illustrating the initial mode of the method of tracking satellites of the vehicle-mounted antenna system according to the present invention.

As the power of the vehicle-mounted antenna system is turned on, the satellite tracking controller 3 comes into start (Step 6). The process goes to the initial mode 7. In the initial mode 7, the step motor is rotated by 1 degree depending on the turning angle of the moving body so as to rotate the antenna by 1 degree until the reception signal level voltage d exceeds a voltage of the reception signal level in case of a rainfall margin, that is, the fourth threshold voltage.

The initial mode 7 will be described in more detail with respect to FIG. 4. First of all, the turning angle of the moving body which is received through an azimuth sensor is read and stored in a resistor 'c' (Step 7a). The step motor is then rotated in a clockwise direction (the rotational direction is expressed by P=0) by 1 degree for the purpose of sequentially detecting the reception signals. At this time, the step motor can be rotated with respect to an absolute azimuthal angle only when 1 degree is subtracted by the value of c, that is, the turning angle of the moving mobile. Accordingly, an absolute turning angle b can be given by b=1−c (Step 7b) and the antenna is rotated by 1 degree (Step 7c). The reception signal level voltage (referred to as "signal strength" in drawings) corresponding to the channel of 27 MHz is stored in 'd' (Step 7d). The process will repeat the Steps 7a through 7d until the stored value of d is larger than the fourth threshold voltage R.

Judgement is then made whether or not the reception signal level voltage d is larger than the fourth threshold voltage R (Step 7e). When the value of d is larger than the value of R, a resistor P indicating the turning direction and a counter CK are reset at zero (P=0, CK=0) and the fourth threshold R is stored in a resistor 'D' (D=R) (Step 7f). In the next, the procedure goes to the maximum value search mode for the purpose of searching for the maximum value of the reception signal level voltage d (Step 20).

Figure 5:
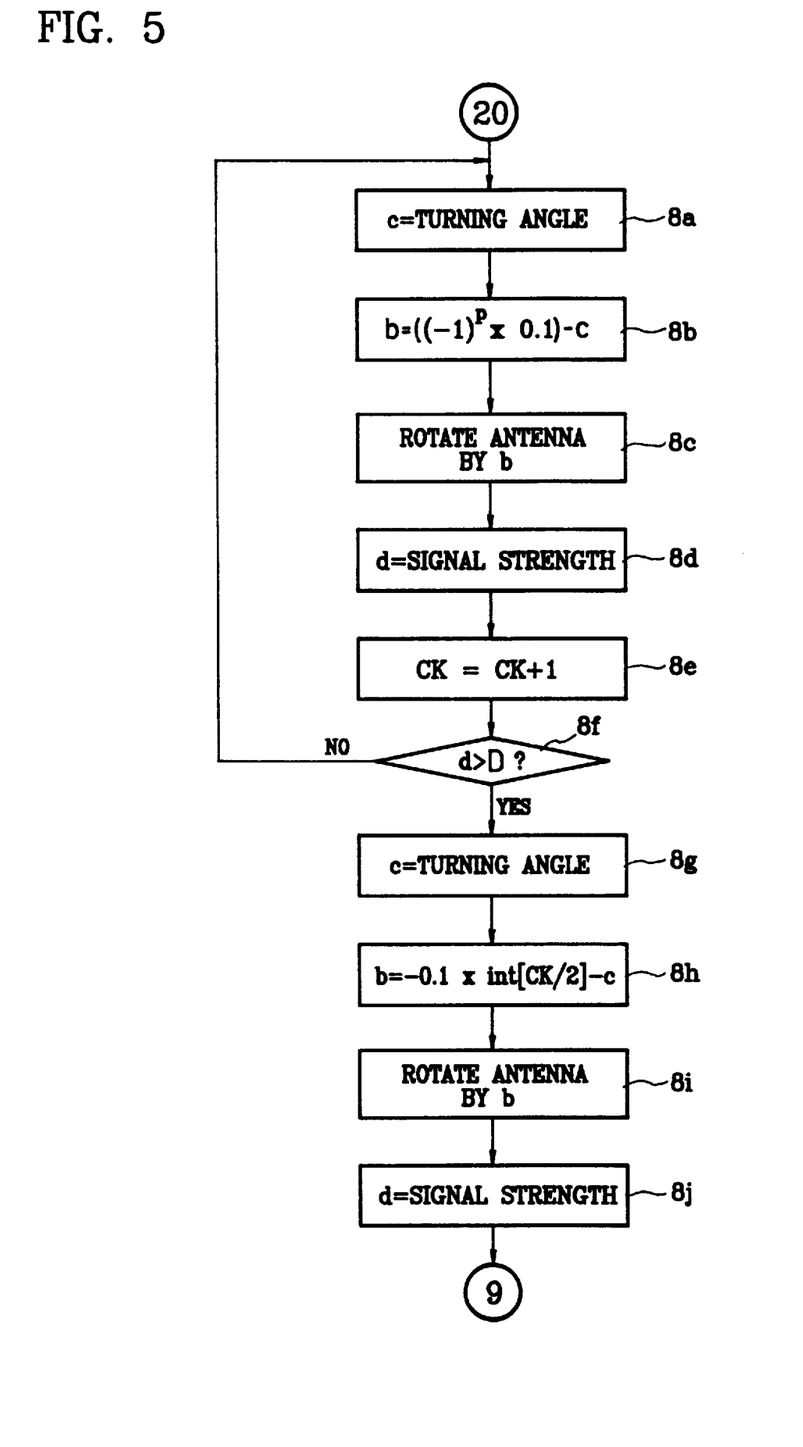
FIG. 5 is a flow chart illustrating the maximum value search mode of the method of tracking satellites of the vehicle-mounted antenna system according to the present invention.

In the maximum value search mode 8, the orientation of the antenna is controlled to coincide with the direction of the satellite. Therefore, the antenna is rotated by 0.2 degree so as to search the first threshold voltage $P_P$ which is a voltage when the reception signal level voltage becomes maximum. At the time, to accurately rotate the antenna, there must be taken into consideration the turning angle of the moving body and the symmetric level of the reception signal level voltage with respect to the maximum value of the reception signal level voltage.

The maximum value search mode will be described in more detail with reference to FIG. 5.

A first turning angle of the moving body is first read and stored in 'c' (Step 8a). The step motor is then rotated in the clockwise direction by 0.1 degree depending on the value of c, that is, the turning angle of the moving body (Steps 8b and 8c). In other words, the antenna will be rotated depending on a first absolute turning angle b of the mobile. The first absolute turning angle b can be calculated from an equation given by b=$((-1)^P \times 0.1$ CK$)-c$, where P is a state value corresponding to the rotational direction of the antenna.

While the antenna is rotated, the reception signal level voltage d is measured and stored in 'd' (Step 8d). During this process, the count number of occurrences of the measurement is incremented by one (CK=CK+1) (Step 8e). The reception signal level voltage d is then repeatedly compared with the fourth threshold voltage R stored in the resistor 'D' in the initial mode (Step 8f). If the value of d is smaller than the value of R while the antenna is rotated, a second turning angle of the vehicle is read and stored in 'c' (Step 8g).

The antenna is rotated in the counter-clockwise direction by 0.1 degree by the number of times of half the counted result CK depending on the value of c, that is, the second turning angle of the mobile, so that the reception signal level voltage becomes maximum (Steps 8h and 8i). The maximum reception signal level voltage is then read and stored in the resistor 'd' (Step 8j). To obtain an angle related to the maximum reception signal level voltage in this process, a second absolute turning angle of the moving body represented by b can be calculated from an equation given by $-0.1$ int[CK/2]$-c$, where c is the second turning angle of the mobile. Assuming that the reception signal level voltages are distributed in a symmetric pattern with respect to the maximum value of the reception signal level voltage, the integer int[CK/2] means the angle with respect to the maximum reception signal level voltage.

Returning to FIG. 3, after the completion of the maximum value search mode, judgement is made whether or not the reception signal level voltage d is larger than the threshold voltage D (Step 9). If the reception signal level voltage d is larger than the threshold voltage D, the process goes to the normal tracking mode 11. If not so because of a sudden signal interruption, the power is reset (Steps 10 and 19) and the process is returned to the initial mode 7.

Figure 6:
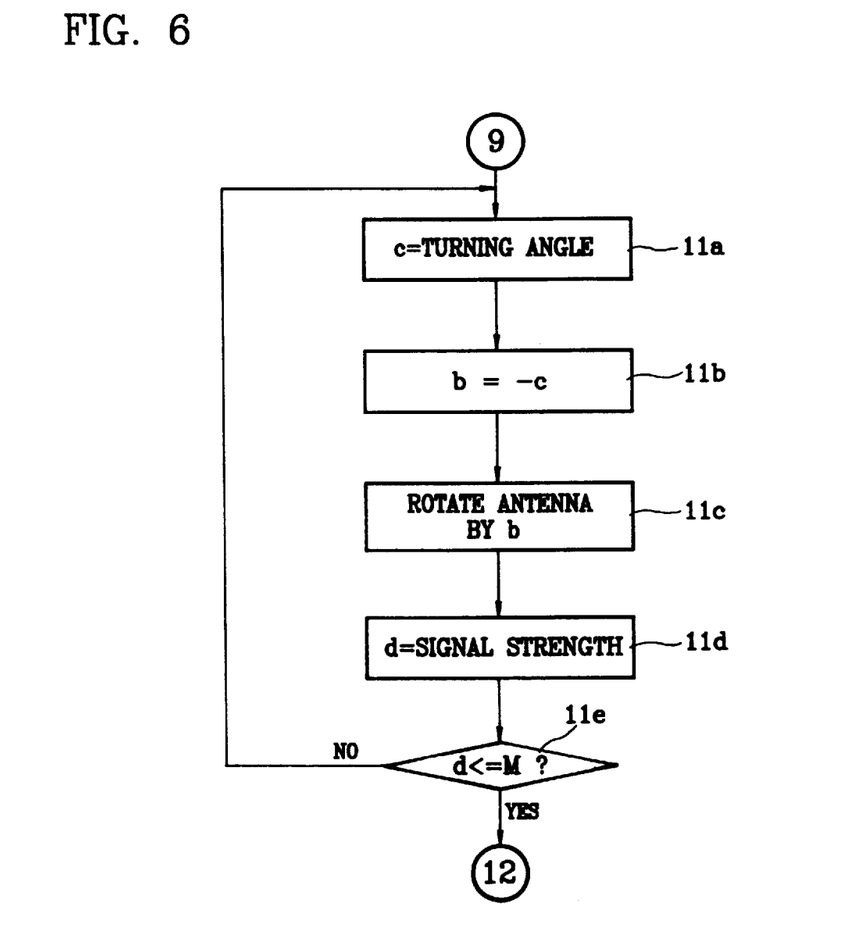
FIG. 6 is a flow chart illustrating the normal track mode of the method of tracking satellites of the vehicle-mounted antenna system according to the present invention.

FIG. 6 is a flow chart illustrating the normal tracking mode of the method of tracking satellites of the vehicle-mounted antenna system according to the present invention.

The normal tracking mode 11 controls the directivity of an azimuth direction of the antenna depending on the turning angle of the moving body when the reception signal level voltage d is larger than the second threshold voltage M.

Described in more detail, the normal tracking mode 11 is a process for maintaining the absolute azimuthal angle for the purpose of making the reception signal level voltage maximum. Referring to FIG. 6, the turning angle of the moving body is first read and stored in the resistor 'c' (Step 11a). The antenna is then rotated in the counter-clockwise direction by the value of c, that is, the stored turning angle of the moving body (Steps 11b and 11c). At the time, the reception signal level voltage d is detected (Step 11d) after the completion of the error correction mode 13. In the next process, the reception signal level voltage d is compared with the second threshold voltage M. If the value of d is larger than the value of M, the normal tracking mode maintains (Steps 11a through 11d). If the reception signal level voltage d is dropped below the second threshold voltage M due to errors of the azimuth sensor, the process goes to Step 12.

The reception signal level voltage d is then compared with the third threshold voltage m (Step 12). If the value of d is smaller than the value of m, the process goes to the signal blocking mode 16. If not so, the process is returned to the error correction mode 13.

The error correction mode of the present invention will be described with respect to FIG. 7.

Figure 7:
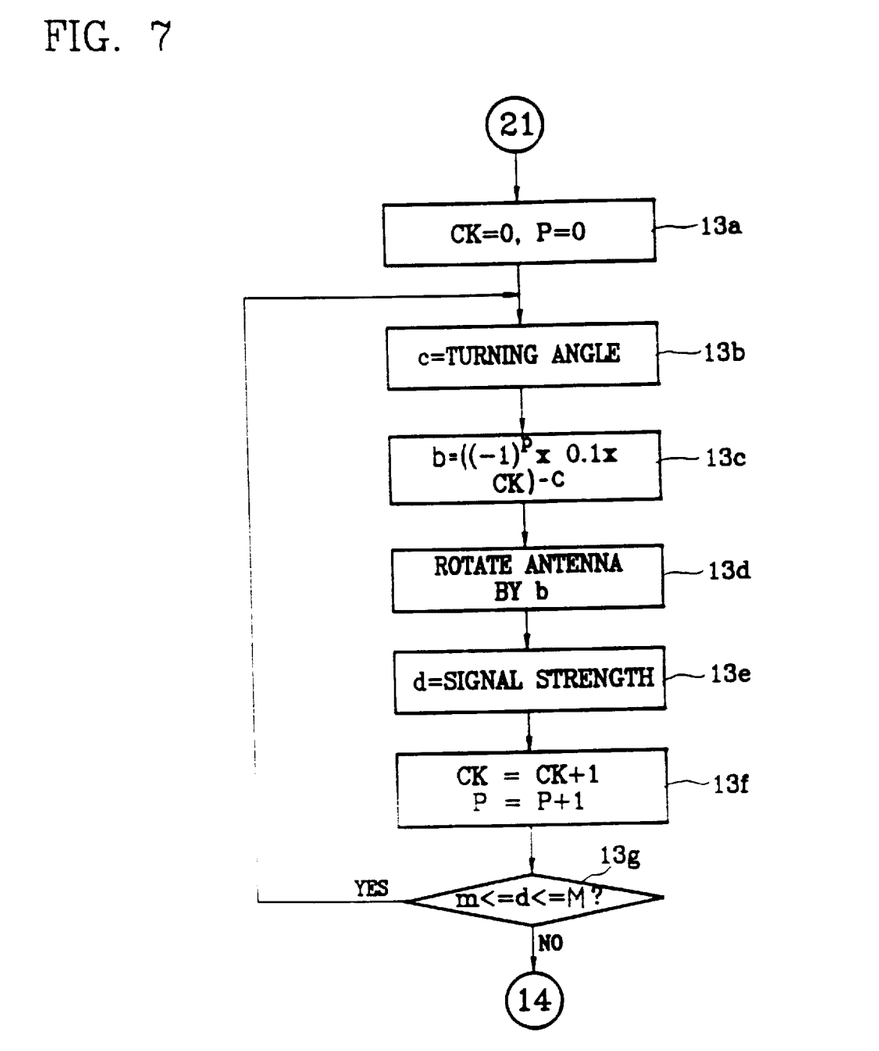
FIG. 7 is a flow chart illustrating the error correction mode of the method of tracking satellites of the vehicle-mounted antenna system according to the present invention.

The error correction mode 13 is a process in which the reception signal level voltage is read as varying the azimuthal angle of the antenna in the left and right directions for the purpose of proceeding to other modes, as shown in FIG. 7.

Described in more detail, the error correction mode 13 resets the counted result CK and the P at zero (CK=0, P=0) (Step 13a). The rotation angle of the moving body is then stored in 'c' (Step 13b). The azimuthal angle b, that is, the absolute turning angle of the moving body can be obtained from the turning angle of the moving body through an equation given by $((-1)^P \times 0.1$ CK$-c-$. Accordingly, the antenna is rotated in the left and right directions as varying the azimuthal angle of $-0.2, +0.3, -0.4$, (Steps 13c and 13d).

Each time the antenna is rotated as above, the reception signal level voltage d is stored in the resistor 'd' (Step 13e). The counted result CK and the P are incremented by one, respectively (Step 13f). The reception signal level voltage d is then compared with the second and third threshold voltages M and m. If the value of d is larger than or equal to the third threshold voltage m, and less than or equal to the second threshold voltage M, the process repeats the steps 13a through 13f. If the reception signal level voltage d is larger than the second threshold voltage M, the process goes to step 15. If not so, it proceeds to the signal blocking mode 16.

In step 15, the value of P is replaced to the value of CK−1 and the value of CK is set at zero. Further, the second threshold voltage M is stored in the resistor 'D' (P=CK−1, CK=0, D=M). With this, the process is returned to the maximum value search mode 8 for the purpose of controlling the antenna so as to make the reception signal level voltage maximum.

It is then judged whether or not the reception signal level voltage d is larger than the value of second threshold voltage M (Step 14). If the value of d is larger than the value of M, the process goes to step 15. Accordingly, the value of CK−1 is stored in 'P', the counted value CK is set at zero and the value of D is replaced to the value of M. The process is returned to the maximum value search mode 8 for the purpose of searching for the maximum value of the reception signal. In the process, the value P represents the moved direction of the motor to search for the maximum value.

Figure 8:
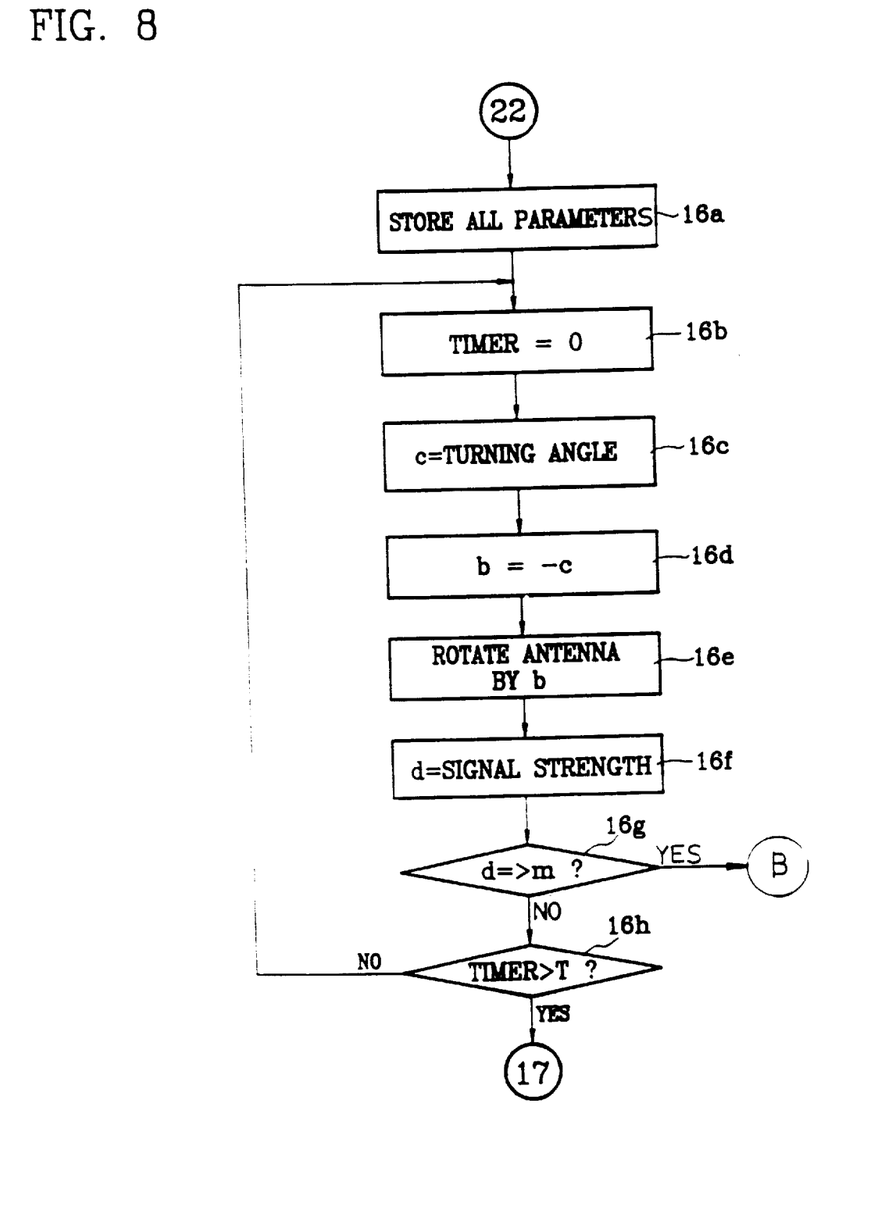
FIG. 8 is a flow chart illustrating the signal blocking mode of the method of tracking satellites of the vehicle-mounted antenna system according to the present invention.

The signal blocking mode 16 will be described with reference to FIG. 8.

The signal breaking mode 16 is accomplished in order to control the direction of the beam of the antenna depending on the turning angle of the moving body until the reception signal level voltage is smaller than the third threshold voltage and the time value in the timer is larger than a predetermined reference time.

In the signal blocking mode 16, all parameters are first stored (Step 16a) and a value of TIMER relating to time in the timer is set at zero (Step 16b). The turning angle of the moving body is read and stored into 'c' (Step 16c). Rotating the antenna in the counter-clockwise direction by the turning angle c of the moving body (Steps 16d and 16e), the reception signal level voltage d is concurrently detected (Step 16f).

The reception signal level voltage d is then compared with the third threshold voltage m (Step 16g). If the value of d is larger than or equal to the value of m, the process is returned to the error correction mode 13. If the value of d is smaller than the value of m, the antenna will be rotated depending on the turning angle of the moving body until the value of TIMER exceeds the predetermined reference time T.

When the reception signal level voltage d does not exceed the third threshold voltage m even though the value of TIMER is over the predetermined reference time T. the process goes to Step 17.

In Step 17, the reception signal level voltage d is compared with the fourth threshold voltage R. If the value of d is larger than the value of R, the process proceeds to the rainfall mode 18. Otherwise it is returned to the initial mode 17.

Figure 9:
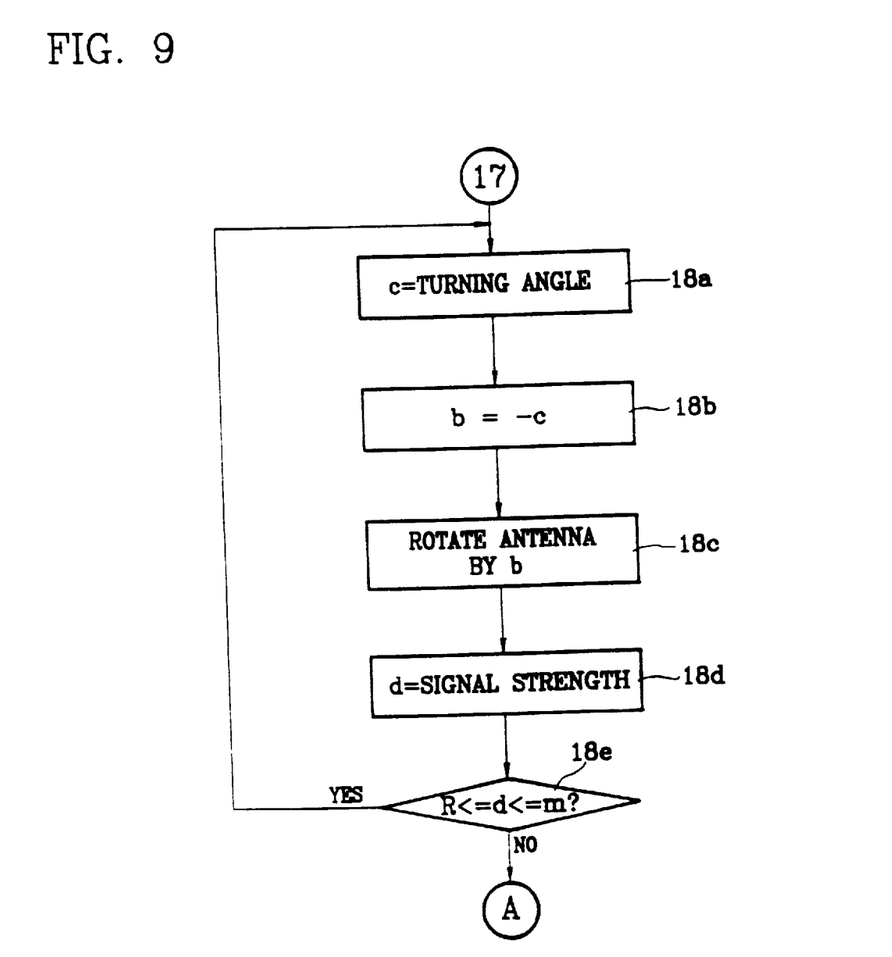
FIG. 9 is a flow chart illustrating the rainfall mode of the method of tracking satellites of the vehicle-mounted antenna system according to the present invention.

The rainfall mode will be described with respect to FIG. 9.

The rainfall mode 18 is performed in order to control the orientation of the antenna in the same manner as the normal tracking mode even though the reception signal level voltage is decreased.

As it is described in the normal tracking mode, the turning angle of the moving body is first read and stored into 'c' (Step 18a). The antenna is then reversely rotated by the turning angle of the moving body (Steps 18b and 18c) and the reception signal level voltage at the time is stored into 'd' (Step 18d). If the reception signal level voltage d is then compared with the third and fourth threshold voltages m and R. If the reception signal level voltage d is larger than or equal to the fourth threshold voltage R, and smaller than or equal to the third threshold voltage m, the procedure is returned to Step 18a. If not so, the process is returned to Step 12.

It will be apparent to those skilled in the art that various modifications and variations can be made in the satellite tracking method for a vehicle-mounted antenna system of the present invention without departing from the spirit or scope of the invention. Thus, it is intended that the present invention cover the modifications and variations of this invention provided they come within the scope of the appended claims and their equivalents.

What is claimed is:

1. A satellite tracking method for a mobile-mounted antenna system, in which a satellite tracking controller receives a signal through a satellite broadcasting receiver and a turning angle of a moving body provided by a gyroscope for the purpose of controlling an antenna orientation control driver and rotating the antenna mounted on the moving body, the satellite tracking method comprising:

an initial mode for rotating the antenna depending on the turning angle of the moving body until a level voltage of a reception signal which is transmitted from a satellite with a system power on is larger than a fourth threshold voltage corresponding to a predetermined rainfall margin;

a maximum value search mode for rotating the antenna depending on the turning angle of the moving body and a symmetric point of the reception signal level voltage with respect to the maximum reception signal level voltage so as to search for a voltage corresponding to the maximum reception signal level voltage, which is defined as a first threshold voltage, the maximum value search mode being accomplished when the reception signal level voltage is larger than the fourth threshold voltage;

a normal tracking mode for controlling the orientation of the antenna depending on the turning angle of the moving body so as to maintain the reception signal level voltage to be larger than a second threshold voltage, the normal tracking mode accomplished when the reception signal level voltage is between the first threshold voltage and the second threshold voltage;

an error correction mode for rotating the antenna in the left and right directions depending on the turning angle of the moving body, the initial mode, the maximum value search mode and the normal tracking mode according to whether the reception signal level voltage is between the second threshold voltage and a third threshold voltage, the error correction mode being performed when the reception signal level voltage is between the second threshold voltage and the third threshold voltage;

a signal blocking mode for controlling the orientation of the antenna depending on the turning angle of the moving body until a time value in a timer is over a predetermined time, the signal blocking mode accomplished when the reception signal level voltage is smaller than the third threshold voltage, and the time value in the timer is not over a predetermined time a rainfall mode for controlling the orientation of the antenna depending on the turning angle of the moving body, until a time value in a timer exceeds a predetermined time the rainfall mode accomplished when the time value in the timer exceeds the predetermined time and the reception signal level voltage is between the fourth threshold voltage and the third threshold voltage even though the reception signal level voltage is in the same range as in the signal blocking mode, wherein the first threshold voltage is greater than the second threshold voltage which is greater than the third threshold voltage which is greater than the fourth threshold voltage, the second threshold voltage is a voltage when the reception signal level voltage is smaller than the first threshold voltage by a predetermined voltage level, the third threshold voltage is a voltage when the reception signal level voltage is smaller than the second threshold voltage by a predetermined voltage level.

2. The method as defined in claim 1, wherein the initial mode comprises the steps of:

reading the turning angle of the moving body;

calculating an absolute turning angle of the moving body by using the turning angle of the moving body so as to sequentially detect the reception signal level voltages;

rotating the antenna by the calculated absolute turning angle of the moving body and concurrently measuring the reception signal level voltage;

repeatedly judging whether or not the reception signal level voltage is larger than the fourth threshold voltage; and when the reception signal level voltage is larger than the fourth threshold voltage, resetting a counter and a resistor indicating a turning direction, and setting the fourth threshold voltage in a resistor.

3. The method as defined in claim 2, wherein the reception signal level voltage is obtained by measuring a signal corresponding to one channel while a turning angle of the antenna is incremented by 1°.

4. The method as defined in claim 2, wherein the absolute turning angle of the moving body is calculated by subtracting the turning angle of the moving body from an absolute azimuthal angle.

5. The method as defined in claim 1, wherein the maximum search mode comprises the steps of:

reading a first turning angle of the mobile;

calculating a first absolute turning angle of the moving body by using the first turning angle of the mobile;

rotating the antenna depending on the first absolute turning angle of the moving body and concurrently measuring a first reception signal level voltage;

increasing the count number of the measurement for the first reception signal level voltage until the first reception signal level voltage is smaller than the fourth threshold voltage;

reading a second turning angle of the moving body when the first reception signal level voltage is smaller than the fourth threshold voltage;

calculating a second absolute turning angle of the moving body by using the second turning angle of the moving body so as to obtain an angle with respect to the maximum value of the reception signal level voltage;

reversely rotating the antenna by the calculated second absolute turning angle of the mobile; and reading a second reception signal level voltage when the antenna is reversely rotated.

6. The method as defined in claim 5, wherein the first absolute turning angle of the moving body is calculated from an equation given by $b=((-1)^P \times 0.1)-c$, where P is a state value corresponding to the turning direction of the antenna and c is the first turning angle of the mobile.

7. The method as defined in claim 5, wherein the first reception signal level voltage is measured by rotating a step motor by 0.1°.

8. The method as defined in claim 5, wherein the second absolute turning angle of the moving body is calculated from an equation given by $$b=-0.1\ \text{int}[CK/2]-c$$

wherein CK is the count value and C is the first turning angle of the mobile.

9. The method as defined in claim 1, wherein the initial mode is performed again after resetting the power when the reception signal level voltage is below the fourth threshold voltage due to a sudden signal interruption after the completion of the maximum value search mode.

10. The method as defined in claim 1, wherein the error correction mode comprises the steps of:

setting the count value and the maximum reception signal level voltage at zero;

calculating the absolute turning angle of the moving body by using the turning angle of the mobile;

rotating the antenna in the left and right directions by the calculated absolute turning angle of the moving body and concurrently measuring the reception signal level voltage;

incrementing the moving direction of the motor by one so as to search for the count value and the maximum reception signal level voltage; and repeatedly judging whether the measured reception signal level voltage is larger than or equal to the third threshold voltage, and smaller than or equal to the second threshold voltage.

11. The method as defined in claim 10, wherein the maximum value search mode is performed when the reception signal level voltage is larger than the second threshold level voltage.

12. The method as defined in claim 10, wherein the absolute turning angle of the moving body is calculated from an equation given by $b=((-1)^P \times 0.1\ CK)-c$, where $(-1)^P$ is a state value corresponding to the final turning direction of the antenna, CK is the counted value and c is the first turning angle of the mobile.

13. The method as defined in claim 1, wherein the signal blocking mode comprises the steps of:

storing all state parameters and setting the timer at zero;

reading and storing the turning angle of the mobile;

reversely rotating the antenna by the turning angle of the moving body and concurrently detecting the reception signal level voltage; and proceeding to the error correction mode, if the detected reception signal level voltage is larger than or equal to the third threshold voltage.

14. The method as defined in claim 13, further comprising the step of judging whether the reception signal level voltage is larger than or equal to the third threshold voltage when the reception signal level voltage is smaller than the third threshold voltage after the completion of the operation of the timer.

15. The method as defined in claim 13, further comprising the step of reversely rotating the antenna based on the turning angle of the moving body during operation of the timer when the detected reception signal level voltage is less than the third threshold voltage.

* * * * *